United States Patent
Wang

(10) Patent No.: US 8,213,052 B2
(45) Date of Patent: Jul. 3, 2012

(54) DIGITAL IMAGE BRIGHTNESS ADJUSTMENT USING RANGE INFORMATION

(75) Inventor: Sen Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 529 days.

(21) Appl. No.: 12/533,325

(22) Filed: Jul. 31, 2009

(65) Prior Publication Data

US 2011/0026051 A1    Feb. 3, 2011

(51) Int. Cl.
- *G06F 15/00* (2006.01)
- *G06K 1/00* (2006.01)
- *H04N 1/60* (2006.01)
- *G06K 15/00* (2006.01)
- *H04N 1/405* (2006.01)

(52) U.S. Cl. ........................ 358/1.9; 358/3.17
(58) Field of Classification Search .................. None
See application file for complete search history.

(56) References Cited

U.S. PATENT DOCUMENTS

| | | | |
|---|---|---|---|
| 4,101,217 A | 7/1978 | Fergg et al. | |
| 4,707,119 A | 11/1987 | Terashita | |
| 4,945,406 A | 7/1990 | Cok | |
| 4,984,013 A | 1/1991 | Terashita | |
| 5,016,043 A | 5/1991 | Kraft et al. | |
| 6,243,133 B1 | 6/2001 | Spaulding et al. | |
| 6,252,976 B1 | 6/2001 | Schildkraut et al. | |
| 6,275,605 B1 | 8/2001 | Gallagher et al. | |
| 6,573,932 B1 | 6/2003 | Adams, Jr. et al. | |
| 6,636,646 B1 | 10/2003 | Gindele | |
| 6,845,181 B2 | 1/2005 | Dupin et al. | |
| 6,873,743 B2 | 3/2005 | Steinberg | |
| 7,043,090 B2 | 5/2006 | Gindele et al. | |
| 7,046,400 B2 | 5/2006 | Gindele et al. | |
| 7,116,838 B2 | 10/2006 | Gindele et al. | |
| 7,129,980 B1 | 10/2006 | Ashida | |
| 7,158,174 B2 | 1/2007 | Gindele et al. | |
| 7,230,538 B2 | 6/2007 | Lai et al. | |
| 7,289,154 B2 | 10/2007 | Gindele | |
| 7,421,149 B2 | 9/2008 | Haynes et al. | |
| 7,421,418 B2 | 9/2008 | Nakano | |
| 7,526,127 B2 | 4/2009 | Koide et al. | |
| 7,652,716 B2 * | 1/2010 | Qiu et al. ................ 348/370 |

(Continued)

FOREIGN PATENT DOCUMENTS

WO    WO 2008/102296 A2    8/2008

(Continued)

OTHER PUBLICATIONS

"Dominant Sets and Pairwise Clustering", by Massimiliano Pavan et al., IEEE Transactions on Pattern Analysis & Machine Intelligence, vol. 29, No. 1, Jan. 2007, pp. 167-172.

(Continued)

*Primary Examiner* — Douglas Tran

(57) ABSTRACT

A method for adjusting the brightness of objects in a digital image using range information that includes distances of pixels in the scene from a reference location, the method comprising: generating a cluster map based at least upon an analysis of the range information and the digital image, the cluster map grouping pixels of the digital image by their distances from the reference location; detecting a plurality of objects in the digital image based at least upon an analysis of the cluster map and the digital image; determining a brightness adjustment amount for each object; and applying the brightness adjustment amounts to the detected objects to form a modified digital image with adjusted brightnesses.

16 Claims, 4 Drawing Sheets

U.S. PATENT DOCUMENTS

| | | |
|---|---|---|
| 2002/0126893 A1 | 9/2002 | Held et al. |
| 2003/0007687 A1 | 1/2003 | Nesterov et al. |
| 2003/0044063 A1 | 3/2003 | Meckes et al. |
| 2003/0044070 A1 | 3/2003 | Fuersich et al. |
| 2003/0044178 A1 | 3/2003 | Oberhardt et al. |
| 2003/0223622 A1 | 12/2003 | Simon et al. |
| 2004/0240749 A1 | 12/2004 | Miwa et al. |
| 2005/0157204 A1 | 7/2005 | Marks |
| 2007/0121094 A1 | 5/2007 | Gallagher et al. |
| 2007/0126921 A1 | 6/2007 | Gallagher et al. |
| 2007/0274604 A1 | 11/2007 | Schechner et al. |
| 2008/0112616 A1 | 5/2008 | Koo et al. |

FOREIGN PATENT DOCUMENTS

| | | |
|---|---|---|
| WO | WO 2009/072070 A1 | 6/2009 |

OTHER PUBLICATIONS

"Object Detection using a Max-Margin Hough Transform" by S. Maji et al., Proc. IEEE Conf. on Computer Vision and Pattern Recognition, 2009.

"Object-Specific Figure-Ground Segregation" by S. X. Yu, et al., Proc. IEE Conf. on Computer Vision and Pattern Recognition, 2003.

"Object Segmentation Using Graph Cuts Based Active Contours" by N. Xu et al., Proc. IEEE Conf. on Computer Vision and Pattern Recognition, 2003.

A. Hoover et al.: "An Experimental Comparison of Range Image Segmentation Algorithms", IEEE Transactions on Pattern Analysis and Machine Intelligence, IEEE Service Center, Los Alamitos, CA, US LNKD-DOI:10.1109/34.506791, vol. 18, No. 7, Jul. 1, 1996, pp. 673-689, XP002213073, ISSN: 0162-8828, p. 674; Table 1.

\* cited by examiner

DIGITAL IMAGE BRIGHTNESS ADJUSTMENT USING RANGE INFORMATION

CROSS-REFERENCE TO RELATED APPLICATIONS

Reference is made to commonly assigned, co-pending U.S. patent application Ser. No. 12/510,431 filed Jul. 28, 2009, entitled: "Detection of Objects Using Range Information", by S. Wang, and commonly assigned, co-pending U.S. patent application Ser. No. 12/511,111 filed Jul. 29, 2009, entitled: "Adjusting Perspective and Disparity in Stereoscopic Image Pairs", by S. Wang, both of which are incorporated herein by reference.

FIELD OF THE INVENTION

This invention relates to digital image enhancement, and more particularly to a method for adjusting object brightnesses in a digital image using range information.

BACKGROUND OF THE INVENTION

In many imaging system, it is desirable to optimize exposure and brightness. However, the captured image is often not pleasing, because of exposure and brightness.

A common problem that occurs in many digital imaging systems is that the images are too dark or too light. Often these problems result from errors introduced by the exposure control system in a digital image capture device. Many methods have been developed to improve the brightness of digital images. Such techniques are often referred to as "scene balance algorithms." Scene balance algorithms can vary widely in their complexity, as well as in the accuracy of their results. They typically involve analyzing the distribution of overall exposure levels and relative color signal levels in an image to determine the appropriate level of brightness and color balance compensation that is needed.

Examples of prior art brightness adjustment methods are described in U.S. Pat. Nos. 4,101,217, 4,707,119, 4,984,013; 4,945,406, 5,016,043, 6,636,646, 6,845,181, 7,129,980 and 7,289,154.

Conventional scene balance algorithms apply global brightness and color balance adjustments to an entire image. Many times only portions of an image may suffer from being too dark or too light. For example, an object in the shadows, or an object that is in the background of a flash image may be too dark, or an image in the foreground of a flash image may be too light. U.S. Pat. Nos. 6,275,605 and 7,043,090 describe methods for adjusting the tone scale of an image so that different brightness adjustments can be applied to different portions of an image. The tone scale adjustments are based on an analysis of the two-dimensional digital images. Sometimes these algorithms suffer from artifacts where the amount of tone scale adjustment is not constant within an object.

Most prior art brightness adjustment methods determine brightness correction values based on an analysis of conventional two-dimensional digital images. US Patent Application Publication No. 2007/0126921 describes an exposure and tone scale adjustment method that uses range information for an image. With this method, the range information is used to determine a weighting function that places additional importance on image regions that are likely to contain important objects. The weighting function is then used to determine an overall exposure adjustment amount for the image. While this method makes it more likely that the main subject of an image is properly exposed, it does not address the problem that different objects in an image may need different exposure adjustments.

SUMMARY OF THE INVENTION

The present invention represents a method for adjusting the brightness of objects in a digital image, the method implemented at least in part by a data processing system and comprising:

receiving the digital image representing a scene;

identifying range information associated with the digital image and including distances of in the scene from a reference location;

generating a cluster map based at least upon an analysis of the range information and the digital image, the cluster map grouping pixels of the digital image by their distances from the reference location;

detecting a plurality of objects in the digital image based at least upon an analysis of the cluster map and the digital image;

determining a brightness adjustment amount for each object; and storing the brightness adjustment amounts in a processor-accessible memory system.

It is an advantage of the present invention that by using range information a plurality of objects can be detected and segmented with improved accuracy. Furthermore, the brightness of each object can be adjusted individually.

It has the additional advantage that the object brightnesses can be adjusted to account for non-uniform lighting of the scene, for example due to fall off associated with flash lighting.

It has the additional advantage that a user interface can be provide user input to independently specify brightness adjustment amounts for each object.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The present invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The phrase, "digital content record", as used herein, refers to any digital content record, such as a digital still image, a digital audio file, a digital video file, etc.

It should be noted that, unless otherwise explicitly noted or required by context, the word "or" is used in this disclosure in a non-exclusive sense.

Figure 1:
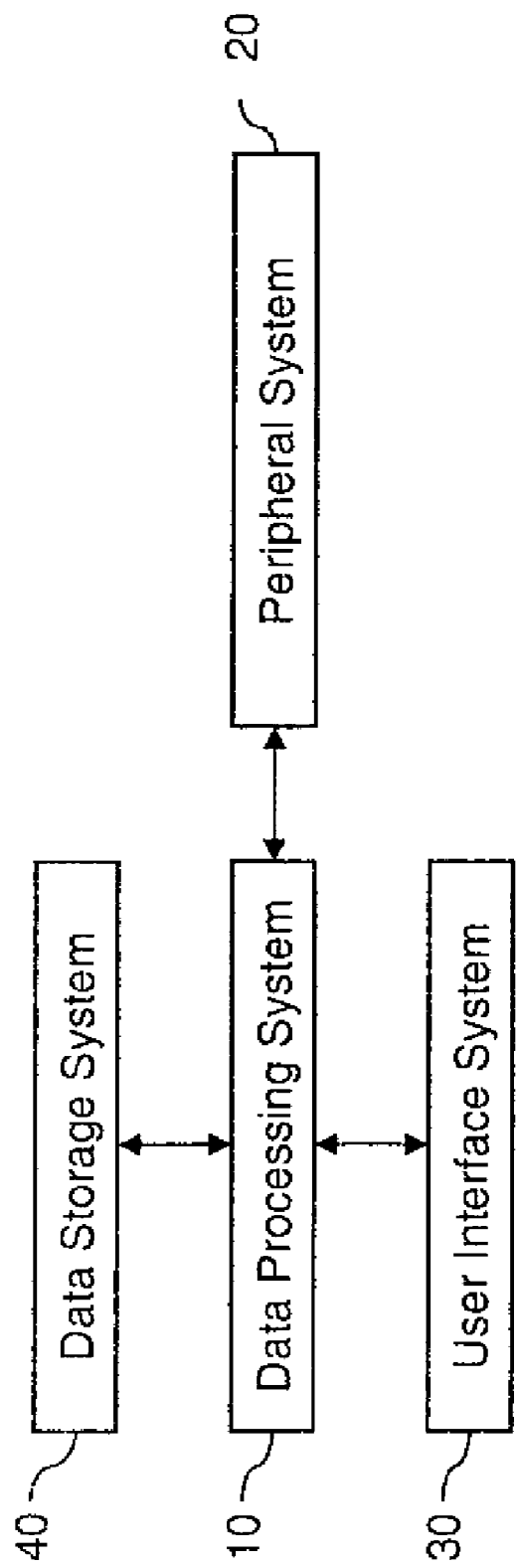
FIG. 1 is a high-level diagram showing the components of a system for adjusting object brightness in a digital image according to an embodiment of the present invention.

FIG. 1 is a high-level diagram showing the components of a system for adjusting object brightness in a digital image according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

Figure 2:
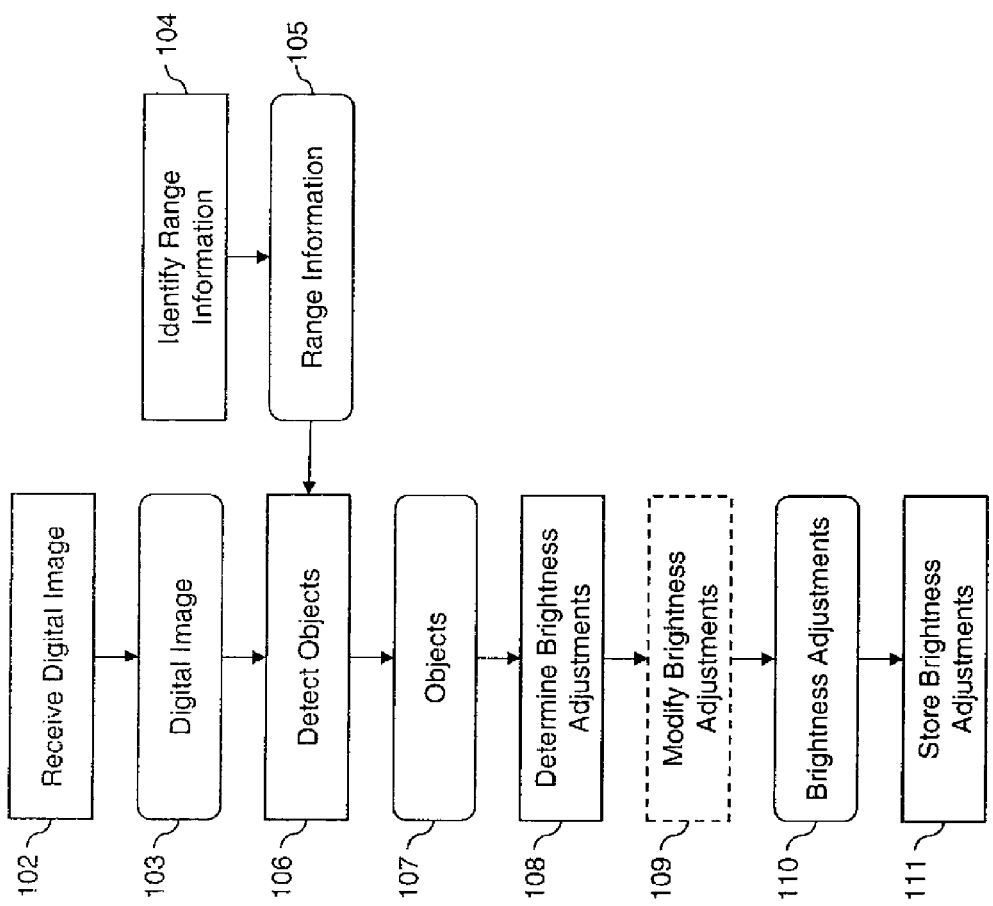
FIG. 2 is a flowchart illustrating a method for adjusting object brightness in a digital image according to an embodiment of the present invention.
Figure 3:
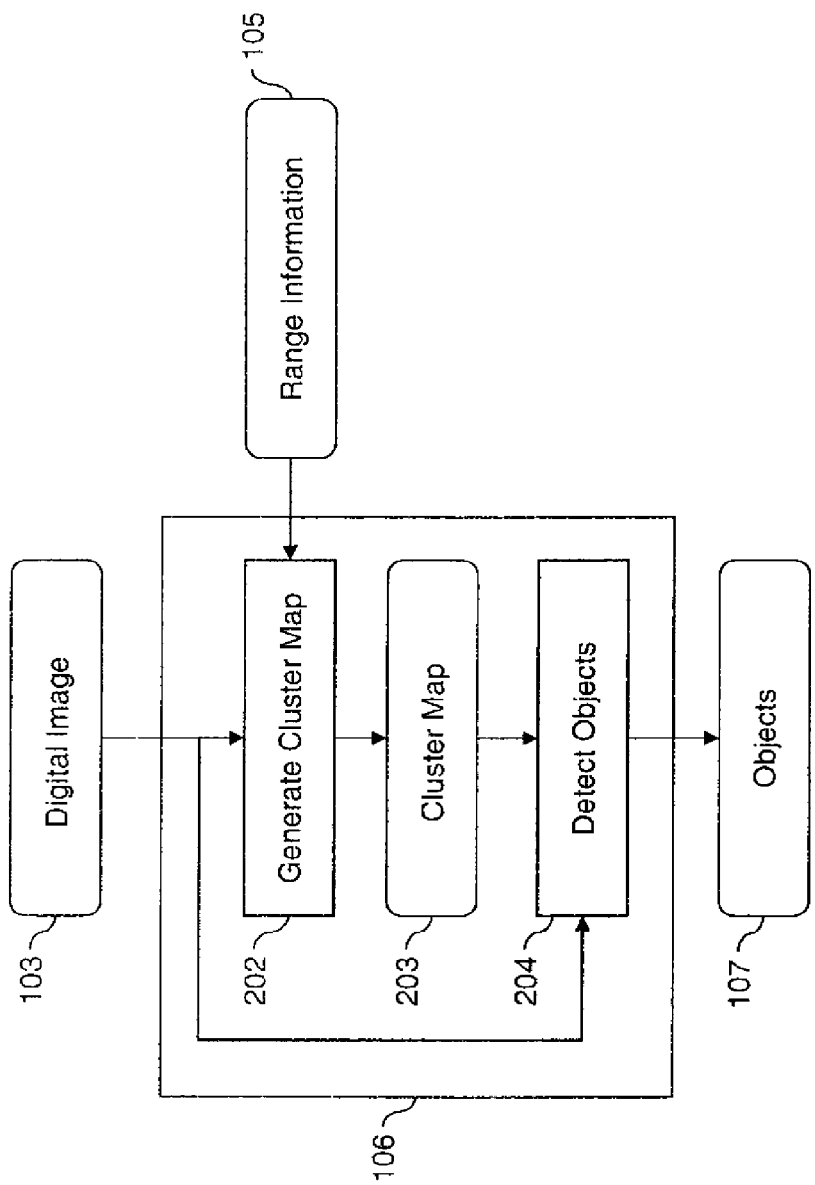
FIG. 3 is a flowchart illustrating additional details for the detect objects step shown in FIG. 2.
Figure 4:
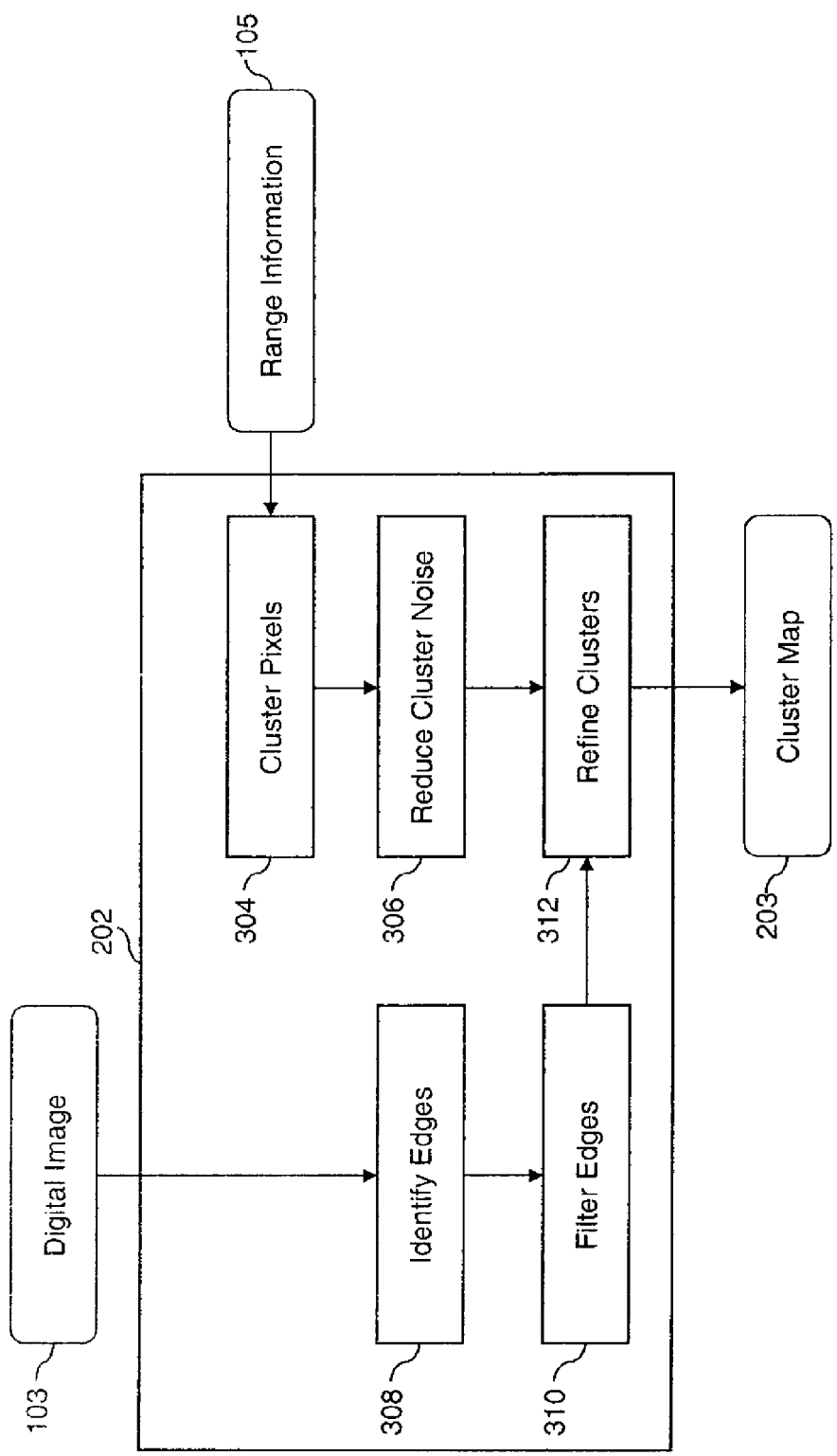
FIG. 4 is a flowchart illustrating additional details for the generate cluster map step shown in FIG. 3.

The data processing system 10 includes one or more data processing devices that implement the processes of the various embodiments of the present invention, including the example processes of FIGS. 2, 3 and 4 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 40 includes one or more processor-accessible memories configured to store information, including the information needed to execute the processes of the various embodiments of the present invention, including the example processes of FIGS. 2, 3 and 4 described herein. The data storage system 40 may be a distributed processor-accessible memory system including multiple processor-accessible memories communicatively connected to the data processing system 10 via a plurality of computers and/or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include connections between devices or programs within a single data processor, connections between devices or programs located in different data processors, and connections between devices not located in data processors at all. In this regard, although the data storage system 40 is shown separately from the data processing system 10, one skilled in the art will appreciate that the data storage system 40 may be contained completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

FIG. 2 is a flow diagram illustrating a method for optimizing brightness in a digital image according to an embodiment of the present invention. A digital image 103 representing a scene is received in a receive digital image step 102. The digital image 103 can be captured by a digital camera or a scanner. Alternately, it may be a frame of a video sequence captured by a video camera.

Range information 105 associated with the digital image 103 is identified in identify range information step 104. The range information 105 includes distances of pixels in the scene from a known reference location. The viewpoint location needs to identified relative to the given range information. Usually, the viewpoint location is the reference location. Range information 105 is preferably presented in the form of a range map provided by a ranging camera which uses visible light, infrared light, laser light or ultrasound to determine distances to pixels in the scene. Alternately, the range map can be provided using stereoscopic image processing techniques that involve capturing images of a scene from multiple viewpoints and determining the range information by evaluating the relative positions of objects in the scene. For cases where the range map has different dimensions (i.e., number of rows and columns) than the digital image 103, the range map is preferably interpolated so that it has the same dimensions In detect objects step 106, a plurality of objects 107 is detected in the digital image based at least upon an analysis of the range information 105. In determine brightness adjustments step 108, a brightness adjustment amount for each object is determined using an analysis which takes into account each object's distance from the viewpoint, which is the position of the camera. Each pixel in the digital image receives a brightness-parameter a based on its corresponding distance from the viewpoint, as indicated by the interpolated range map:

$$\alpha(x,y)=f(dis(x,y))$$

where $\alpha(x, y)$ is the brightness parameter of the pixel in location (x, y) in the digital image, $dis(x, y)$ is the distance of this pixel from the viewpoint, and $f(\ )$ is a linear function or a nonlinear function such as a power function, a polynomial function or an exponential function. For example, to correct for brightness differences due to non-uniform lighting in a flash scene, the $f(\ )$ function can be designed to compensate for the fact that exposure will fall off according to the well-known "inverse square law" relationship so that distant objects are brightened while closer objects are darkened.

A brightness adjustment amount γ of each object that was detected in detect object step 106 is determined by taking an average of the brightness parameter values α(x, y) for every pixel in that object, as $$\gamma_j = \frac{1}{m} \sum_{i \in object\, j} \alpha(i),$$

where $\gamma_j$ is the brightness adjustment amount for the $j^{th}$ object and m is the number of pixels in the $j^{th}$ object.

In addition to the brightness-parameter α(x, y) that is based on the range value, additional brightness parameters can also be used. For example, an additional brightness parameter can be based on the location of the pixel within the image (e.g., the brightness of pixels near the edges of the digital image may be increased to account for lens fall-off in the image). Similarly, an additional brightness parameter can be based on local image structure (e.g., the brightness of pixels located at or near image locations having high edge gradient are may be increased).

In another variation of the present invention, the brightness adjustment amounts for the detected objects 107 can be specified by a user using a digital image editing application having a user interface. The user interface would allow the user to provide user input by selecting one of the detected objects 107 and specify a desired brightness adjustment amount, for example using a slide bar. The brightness adjustment amount could be applied to the object 107 and a preview image could be presented to the user showing the new brightness level. The user-specified brightness adjustment amounts can be supplemental to the automatically determined brightness adjustment amounts, or alternatively they can be specified relative to the unadjusted object brightnesses in the original digital image 103.

In optional modify brightness adjustments step 109, the brightness adjustments for each object are modified responsive to other factors. (The dashed lines in FIG. 2 indicate optional features.) For example, image analysis algorithms can be used to identify which objects 107 correspond to people and the brightness adjustments can be modified accordingly. The resulting brightness adjustments 110 are stored in a processor-accessible memory system using a store brightness adjustments step 111.

The brightness of each object in the digital image 103 can be adjusted by applying each object's brightness adjustment 110. Methods for modifying the brightness of an image are well-known in the art. In a preferred embodiment of the present invention, when the pixel values of the digital image 103 represent the log of the exposure, then the brightness adjustment 110 can be applied by linearly adding an offset to the pixel values. Similarly, when the pixel values of the digital image 103 are proportional with the exposure, then the brightness adjustment 110 can be applied by nonlinearly scaling the pixel values by a constant multiplier. In either case, the brightness adjustment 110 models the physical process of scaling the amount of light in the scene (e.g. a dimming or brightening of the source illumination). The brightness adjustments 110 can also be applied in other ways. For example, the L* (lightness) or the Y (luma) of an object can be shifted or nonlinearly modified when the digital image 103 is in the CIELAB color space or a $YC_rC_b$ luma-chroma color space, respectively.

FIG. 3 is a flowchart illustrating additional details for the detect objects step 106 shown in FIG. 2 according to an embodiment of the present invention. The digital image 103 and range information 105 are provided as inputs. In generate cluster map step 202, a cluster map 203 is generated based on an analysis of the range information 105 and the digital image 103. Additional details of the generate cluster map step 202 will be described below with reference to FIG. 4. In detect objects step 204, objects 107 and a background are detected in the digital image 103 by combining the cluster map 203 and the digital image 103 according to:

objects=f(clustermap,I)

where the function f( ) is an object segmentation operation applied to the digital image I using the cluster map 203. The digital image I will be the digital image 103. The function f( ) works by identifying pixels in the cluster map 203 having the same distance, then assigning the corresponding pixels in the digital image 103 to a corresponding object 107.

FIG. 4 is a flowchart illustrating additional details for the generate cluster map step 202 shown in FIG. 3, according to an embodiment of the present invention. A digital image 103 and range information 105 including a range map are provided as discussed earlier. In cluster pixels step 304, pixels in the range map are clustered by using a clustering algorithm such as the method described in "Dominant Sets and Pairwise Clustering" (IEEE Transactions on Pattern Analysis & Machine Intelligence, Vol. 29, No. 1, January 2007, pp. 167-172). The cluster groups generated in this manner typically have a lot of noise. Reduce cluster noise step 306 is used to reduce the cluster noise using a morphological method to fill small holes and remove small cluster regions.

Edges are detected in the digital image using an identify edges step 308. In a preferred embodiment of the present invention, the edges are identified using a gradient operation. The gradient of an image is defined as:

$$\nabla I = [G_x, G_y] = \left[\frac{\partial I}{\partial x}, \frac{\partial I}{\partial y}\right]$$

where I(x, y) is the intensity of pixel at location (x, y). The magnitude of the gradient vector is:

$$G = [G_x^2 + G_y^2]^{1/2}.$$

Edges are detected in the digital image based on the magnitude of the gradient in each pixel.

Next, filter edges step 310 is used to filter the detected edges to remove insignificant edges and keep the significant edges. Mathematically, the filtering operation can be expressed as:

$$E = f \times e,$$
$$f = \begin{cases} 0 & \text{if } (S(e) \leq T) \\ 1 & \text{if } (S(e) > T), \end{cases}$$

where e is one of the detected edges, S(e) is the sum of gradient magnitudes of each pixel in the edge e, f is a filter mask and T is the threshold.

The pixel clusters produced by the reduce cluster noise step 306 will typically still have errors in the boundary areas because of the noise in the range map. A refine clusters step 312 is used refine the cluster groups and produce cluster map 203. The boundary of cluster groups are refined by using the significant edges computed in the filter edges step 310. If pixels are outside of the detected significant edges in each cluster group, they will be removed. This will make the boundaries of the cluster groups much more accurate. Next, an average distance, n, is computed in each of the refined cluster group as:

$$n = \frac{1}{m} \sum_{i \in cluster\,w} dis(i),$$

where m is the number of pixels in the cluster group w, dis(i) is the distance of the $i^{th}$ pixel to the viewpoint location. By assigning the average distance to each pixel in the cluster groups, the cluster map is generated.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST

10 Data processing system
20 Peripheral system
30 User interface system
40 Data storage system
102 Receive digital image step
103 Digital image
104 Identify range information step
105 Range information
106 Detect objects step
107 Objects
108 Determine brightness adjustments step
109 Modify brightness adjustments step
110 Brightness adjustments
111 Store brightness adjustments step
202 Generate cluster map step
203 Cluster map
204 Detect objects step
304 Cluster pixels step
306 Reduce cluster noise step
308 Identify edges step
310 Filter edges step
312 Refine clusters step

What is claimed is:

1. A method for adjusting the brightness of objects in a digital image, the method implemented at least in part by a data processing system and comprising:
receiving the digital image representing a scene;
identifying range information associated with the digital image, the range information including distances of pixels in the scene from a reference location;
generating a cluster map based at least upon an analysis of the range information and the digital image, the cluster map grouping pixels of the digital image by their distances from the reference location;
detecting a plurality of objects in the digital image based at least upon an analysis of the cluster map and the digital image;
determining a brightness adjustment amount for each object; and
storing the brightness adjustment amounts in a processor-accessible memory system.

2. The method of claim 1, further comprising adjusting the brightness of the detected object in the digital image responsive to each object's brightness adjustment amount; and storing a modified digital image in the processor-accessible memory system, the modified digital image incorporating the adjusted object brightnesses.

3. The method of claim 1, wherein the analysis of the cluster map and the digital image comprises:
identifying edges in the digital image; and
refining the pixel groupings in the cluster map at least by comparing the identified edges with borders of the pixel groupings.

4. The method of claim 3, wherein the identified edges undergo a filtering process to remove insignificant edges prior to being compared with the borders of the pixel groupings.

5. The method of claim 1 wherein the brightness adjustment amount for each object is determined based at least upon an analysis of each object's distance from the reference location.

6. The method of claim 5, wherein the brightness adjustment amount for a detected object is determined at least by:
computing a brightness parameter for each pixel in the detected object, the brightness-parameter being a function of a distance between the pixel and a viewpoint; and
determining the brightness adjustment amount for the detected object responsive to the brightness-parameters.

7. The method of claim 6 where the brightness parameter is also a function of the location of the pixel or the local image structure.

8. The method of claim 1 wherein the brightness adjustment amount for each object is determined to correct for non-uniform lighting of the scene.

9. The method of claim 1, wherein the brightness adjustment amount for each object is determined, at least in part, by user input.

10. The method of claim 1, further comprising the step of identifying a viewpoint location.

11. The method of claim 10, wherein the viewpoint location is the reference location.

12. The method of claim 1, wherein the range information is received from a ranging camera that senses visible light, infrared light, ultrasound, or laser light.

13. The method of claim 1, wherein the range information is identified an analysis of a stereoscopic image pair.

14. The method of claim 1, wherein the digital image is captured by a digital camera or a scanner.

15. A computer program product for performing the method in claim 1.

16. A system for adjusting the brightness of objects in a digital image comprising:
a data processing system; and
a memory system communicatively connected to the data processing system and storing instructions configured to cause the data processing system to implement a method for adjusting the brightness of objects in a digital image, wherein the instructions comprise:
receiving the digital image representing a scene;
identifying range information associated with the digital image, the range information including distances of pixels in the scene from a reference location;
generating a cluster map based at least upon an analysis of the range information and the digital image, the cluster map grouping pixels of the digital image by their distances from the reference location;
detecting a plurality of objects in the digital image based at least upon an analysis of the cluster map and the digital image;
determining the brightness adjustment amount in each object;

applying the brightness adjustment amounts to adjust the brightness of the detected objects in the digital image forming a modified digital image with adjusted object brightnesses; and storing or printing the generated the modified digital image with the adjusted object brightnesses.

* * * * *